United States Patent
Kobayashi

(10) Patent No.: US 10,088,119 B2
(45) Date of Patent: Oct. 2, 2018

(54) VEHICLE LAMP

(71) Applicant: ICHIKOH INDUSTRIES, LTD., Isehara-shi, Kanagawa-ken (JP)

(72) Inventor: Yutaro Kobayashi, Isehara (JP)

( * ) Notice: Subject to any disclaimer, the term of this patent is extended or adjusted under 35 U.S.C. 154(b) by 0 days.

(21) Appl. No.: 15/532,621

(22) PCT Filed: Dec. 7, 2015

(86) PCT No.: PCT/JP2015/084296
§ 371 (c)(1),
(2) Date: Jun. 2, 2017

(87) PCT Pub. No.: WO2016/088900
PCT Pub. Date: Jun. 9, 2016

(65) Prior Publication Data
US 2017/0336045 A1     Nov. 23, 2017

(30) Foreign Application Priority Data

Dec. 5, 2014   (JP) .................... 2014-247394

(51) Int. Cl.
| | |
|---|---|
| *B60Q 1/32* | (2006.01) |
| *F21S 8/10* | (2006.01) |
| *F21S 43/239* | (2018.01) |
| *F21S 43/31* | (2018.01) |
| *F21S 43/40* | (2018.01) |

(52) U.S. Cl.
CPC .............. *F21S 43/239* (2018.01); *B60Q 1/32* (2013.01); *F21S 43/31* (2018.01); *F21S 43/40* (2018.01); *F21S 48/2243* (2013.01); *F21S 48/234* (2013.01); *F21S 48/24* (2013.01)

(58) Field of Classification Search
CPC ........ B60Q 1/32; F21S 43/236; F21S 43/237; F21S 43/241; F21S 43/245
See application file for complete search history.

(56) References Cited

U.S. PATENT DOCUMENTS

| | | | |
|---|---|---|---|
| 2009/0154186 A1* | 6/2009 | Natsume | B60Q 1/0041 362/516 |
| 2010/0254152 A1* | 10/2010 | Taleb-Bendiab | B60Q 1/0035 362/551 |

(Continued)

FOREIGN PATENT DOCUMENTS

JP      2013-171658 A     9/2013

*Primary Examiner* — Alexander Garlen
(74) *Attorney, Agent, or Firm* — Foley & Lardner LLP

(57) ABSTRACT

A vehicle lamp provided with: an elongated light guide member provided in a lamp chamber, an incident end part being positioned below said member; and a light source provided in the lamp chamber so as to face the incident end part. The light guide member has: a light guide main part having an elongated shape in which one end is the incident end part, a prism part being provided along the longitudinal direction, the prism part causing a portion of the light incident from the incident end part to be emitted in the irradiation direction; and a flange part projecting from the light guide main part in the direction intersecting the irradiation direction. The flange part is provided with a reflecting surface that forms a depression angle with a projecting end face when viewed from the incident end part side within a prescribed range viewed in the longitudinal direction.

9 Claims, 11 Drawing Sheets

(56) References Cited

U.S. PATENT DOCUMENTS

| | | | |
|---|---|---|---|
| 2013/0044503 A1* | 2/2013 | Mihara | F21S 48/2268 362/511 |
| 2014/0247616 A1* | 9/2014 | Arrivet | B60Q 1/0052 362/511 |
| 2015/0362659 A1* | 12/2015 | Nishihata | G02B 6/0038 362/511 |
| 2016/0193955 A1* | 7/2016 | Ogata | B60Q 1/0052 362/511 |

* cited by examiner

[FIG. 1]
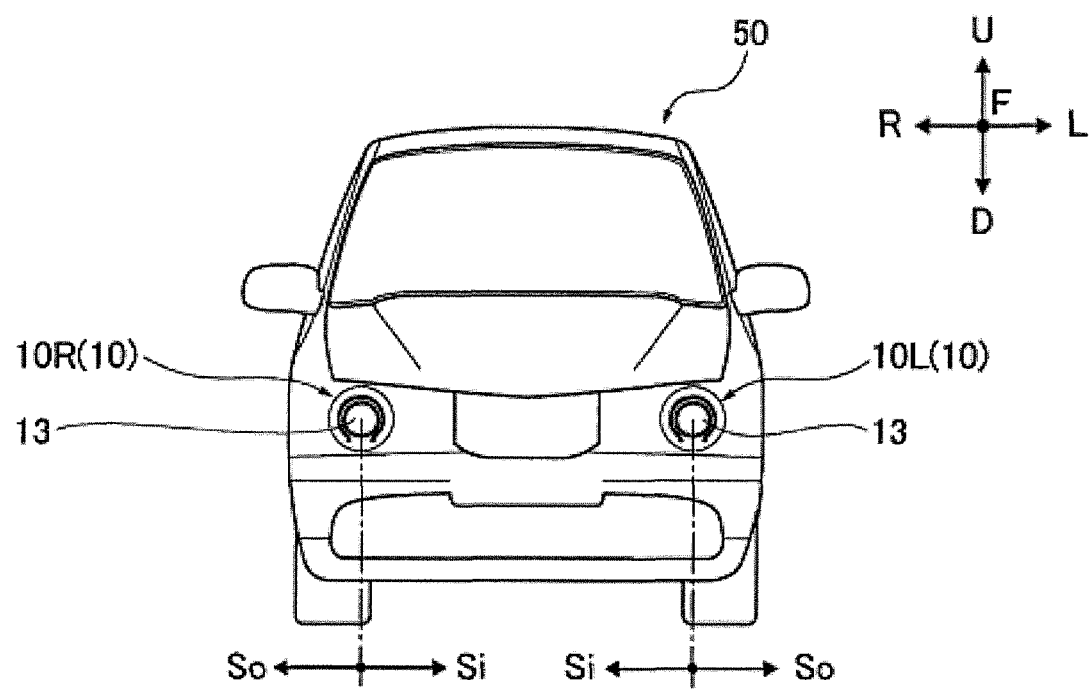

[FIG. 2]
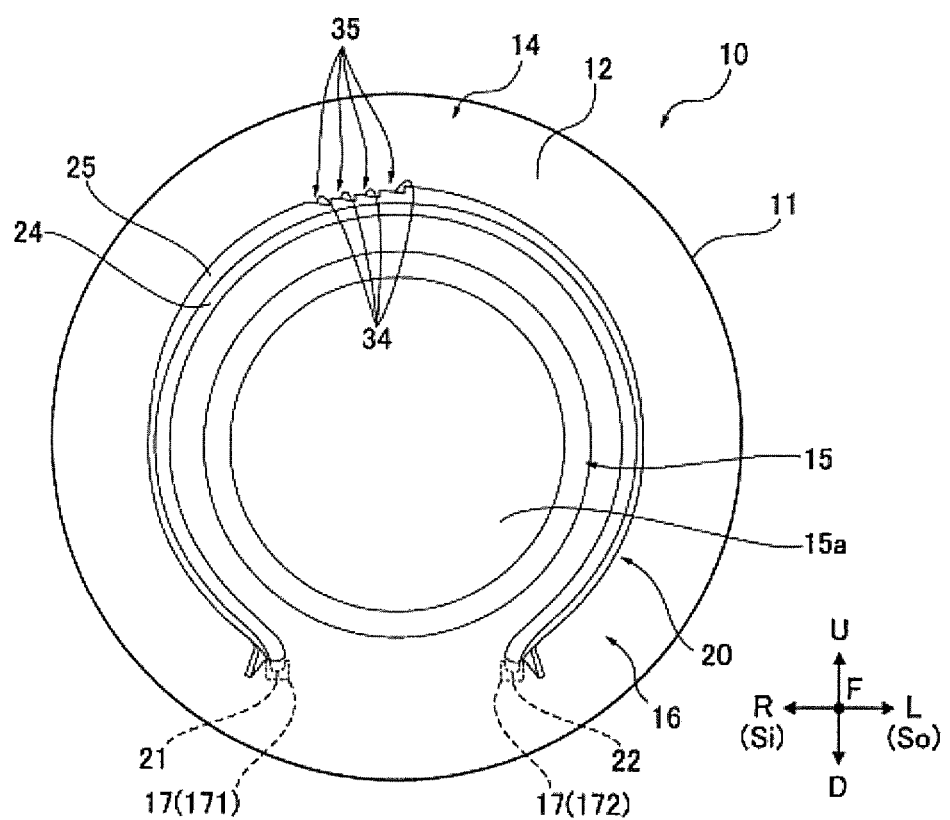

[FIG. 3]
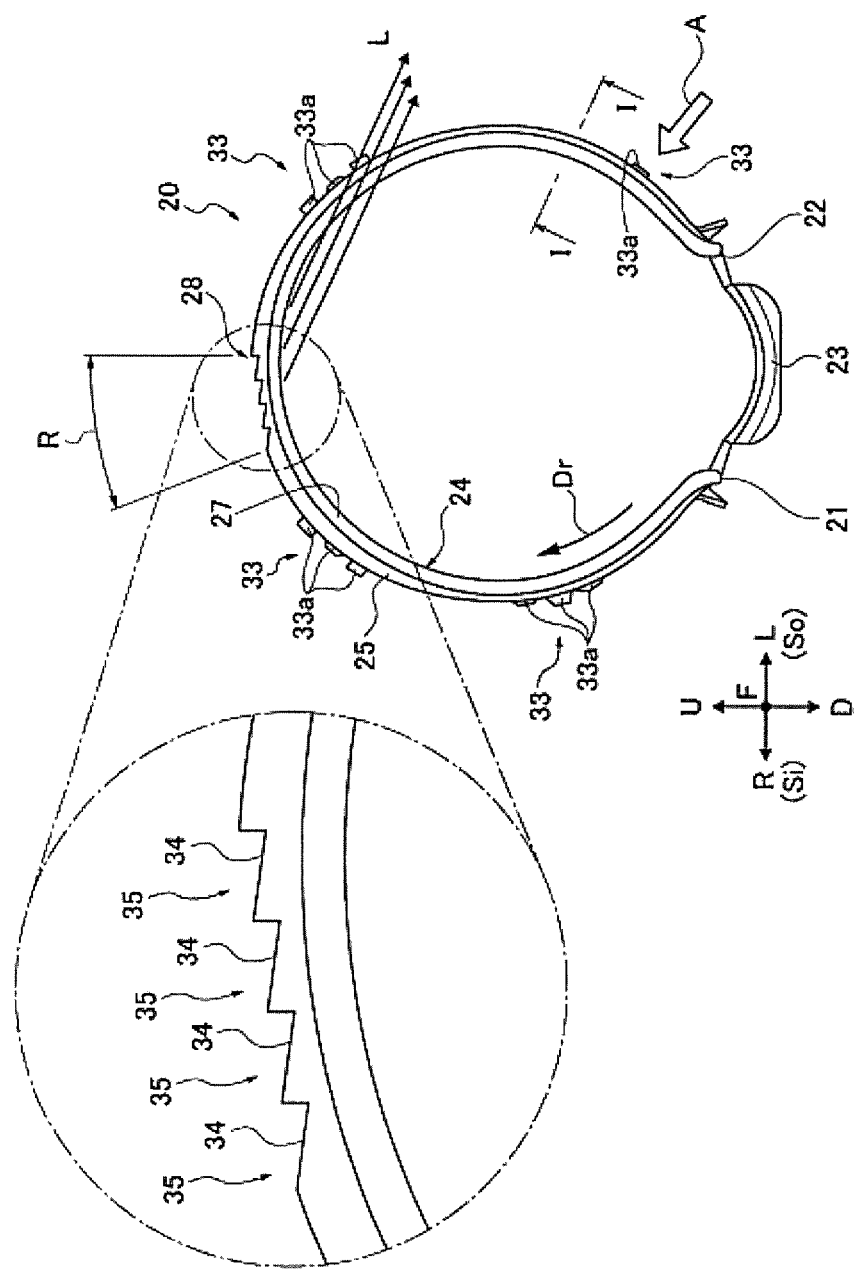

[FIG. 4]
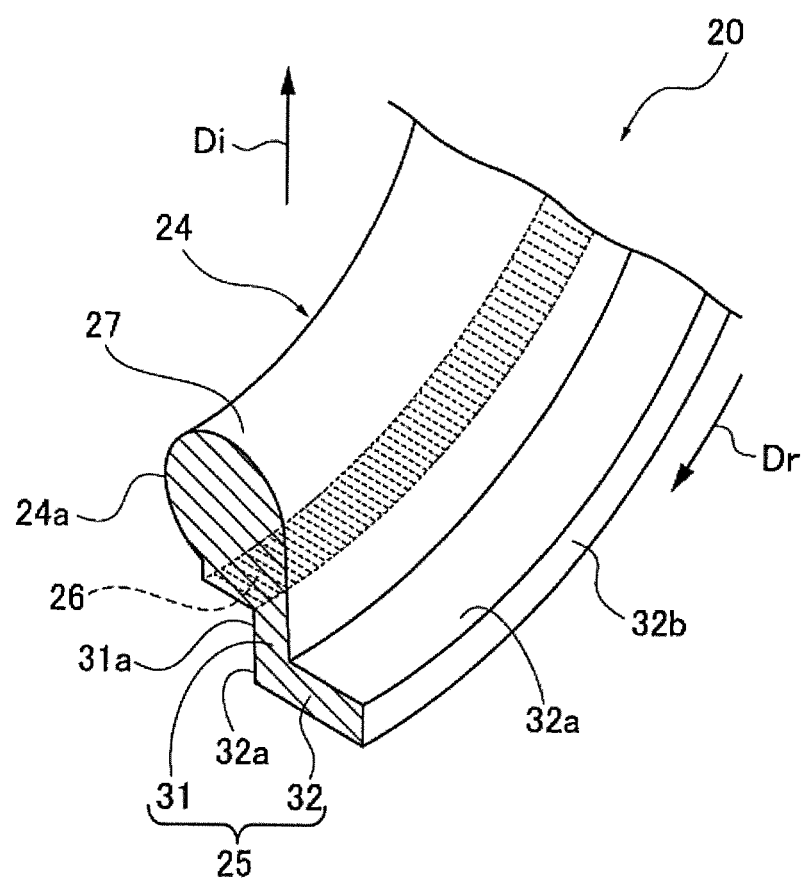

[FIG. 5]
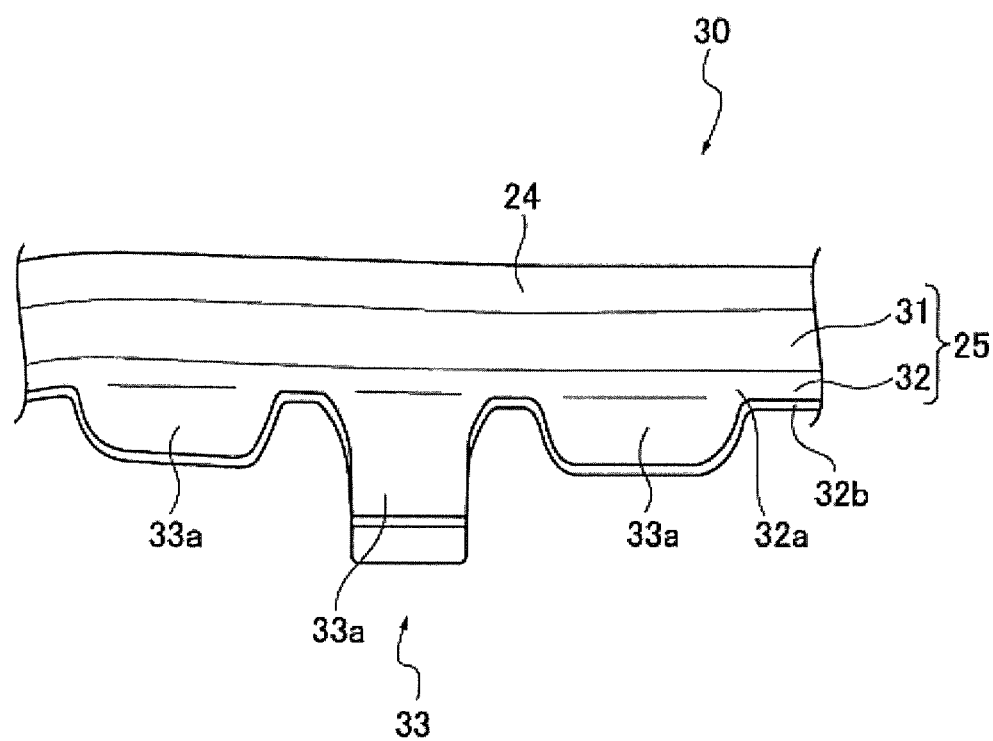

[FIG. 6]
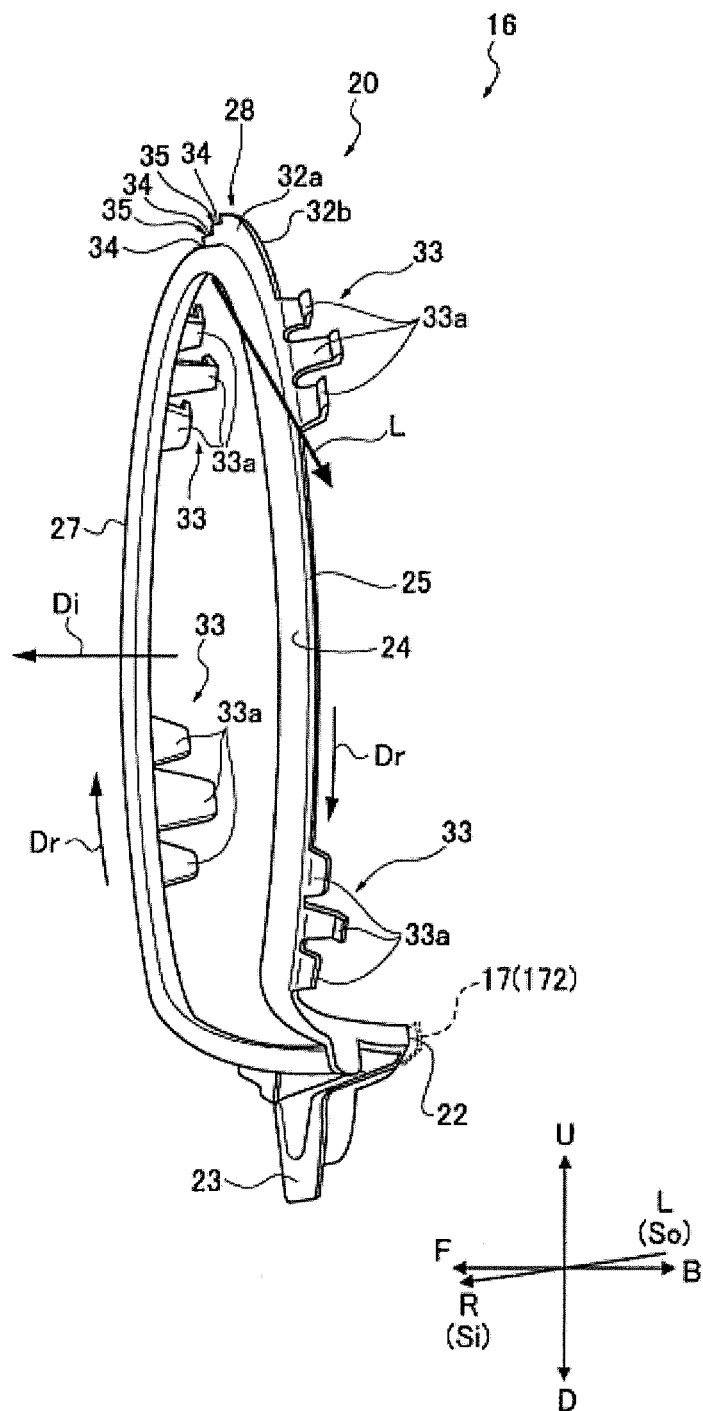

[FIG. 7]
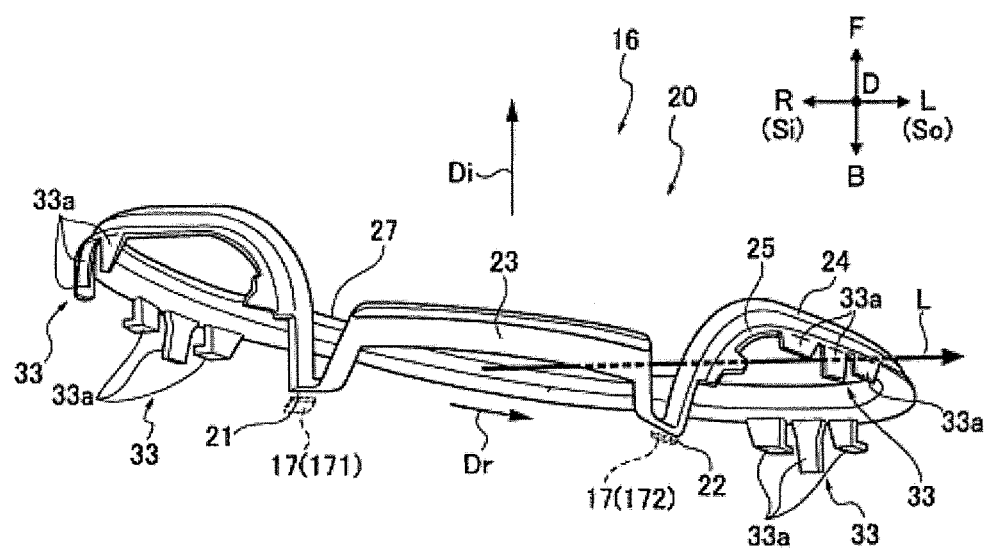

[FIG. 8]
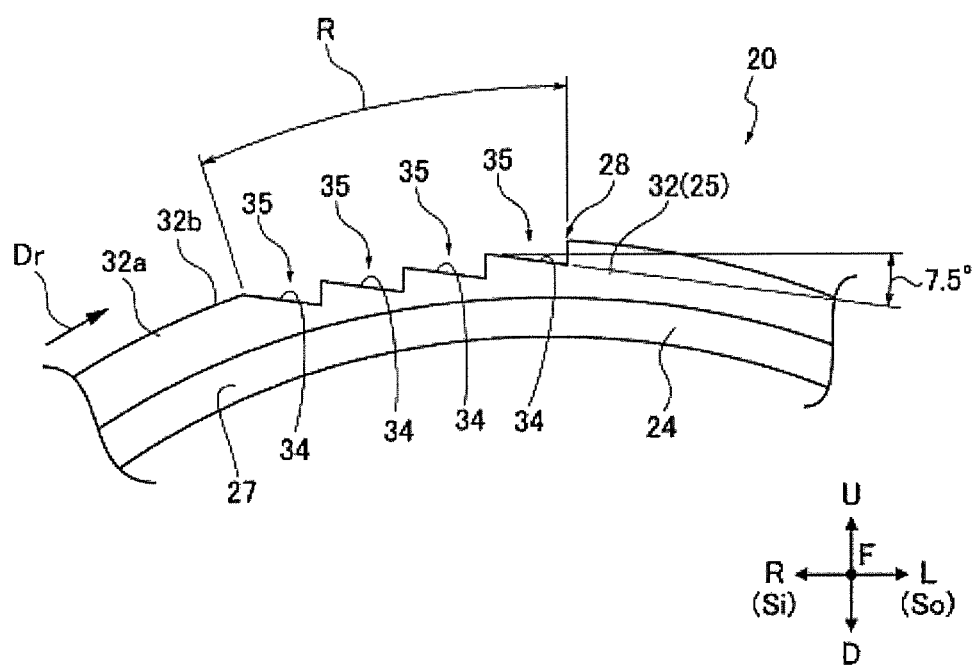

[FIG. 9]
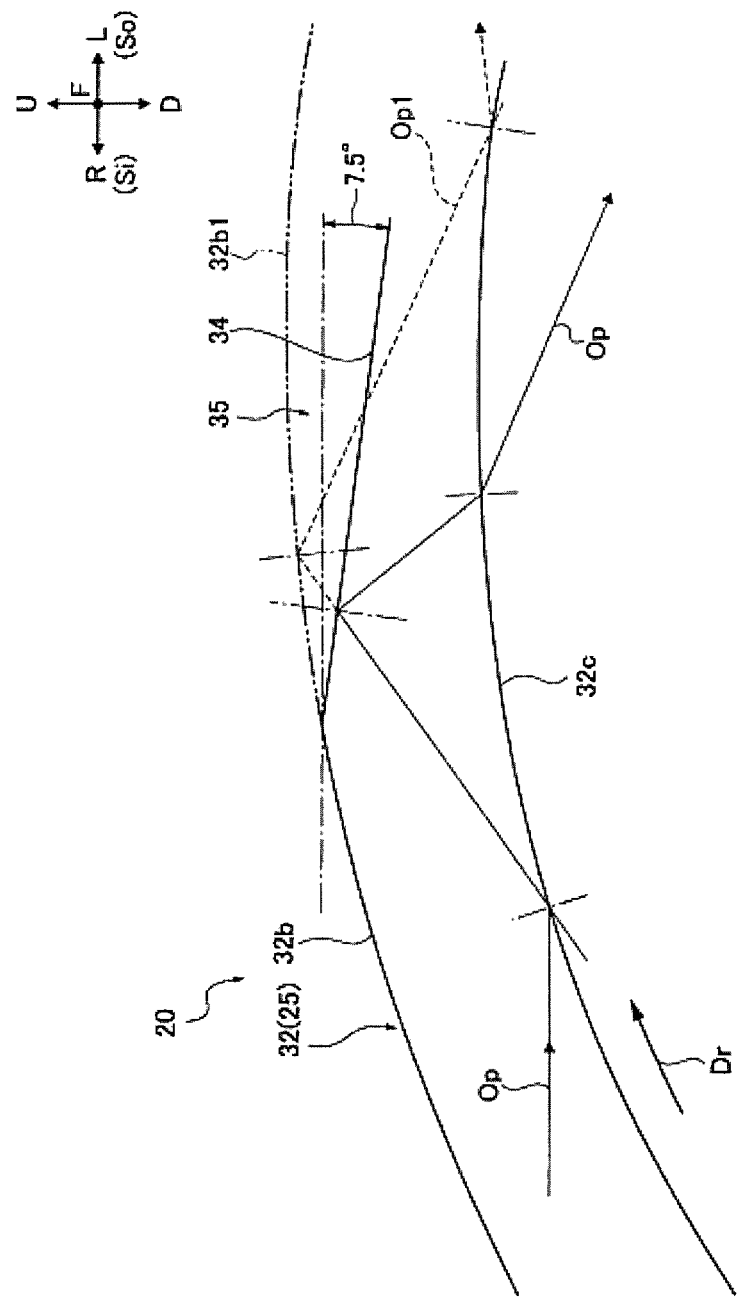

[FIG. 10]
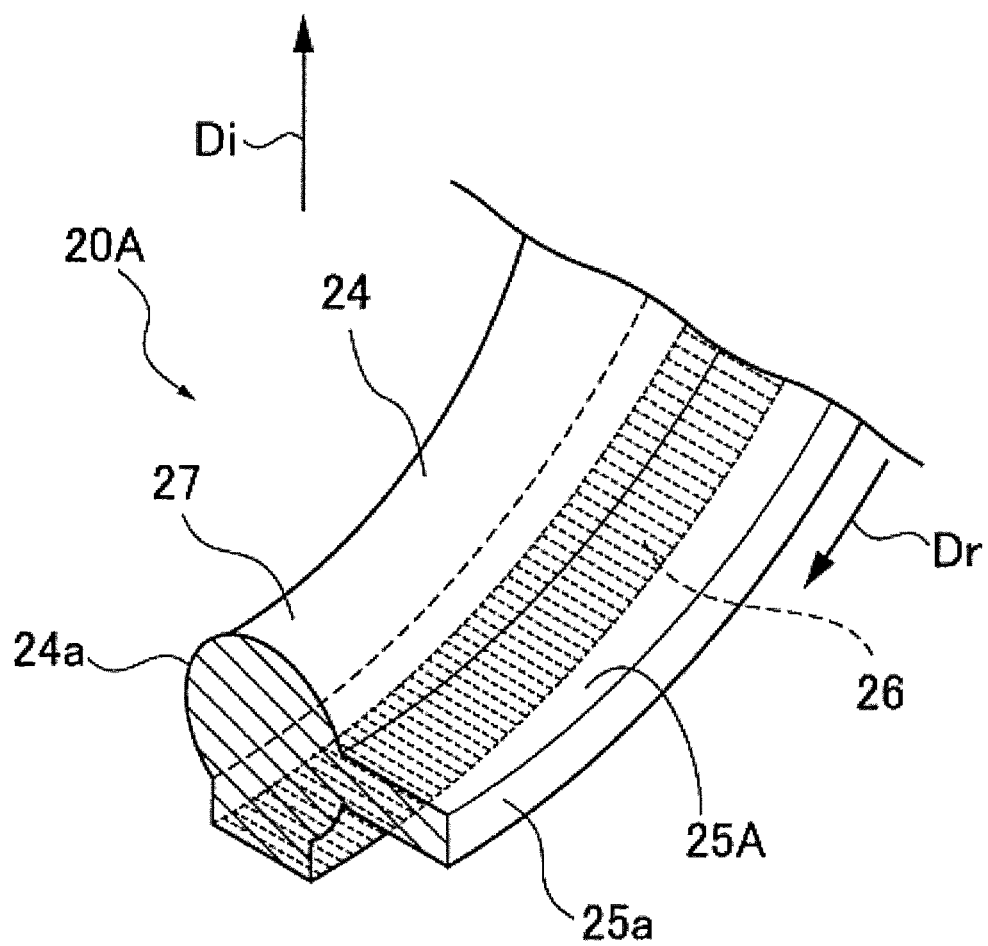

[FIG. 11]
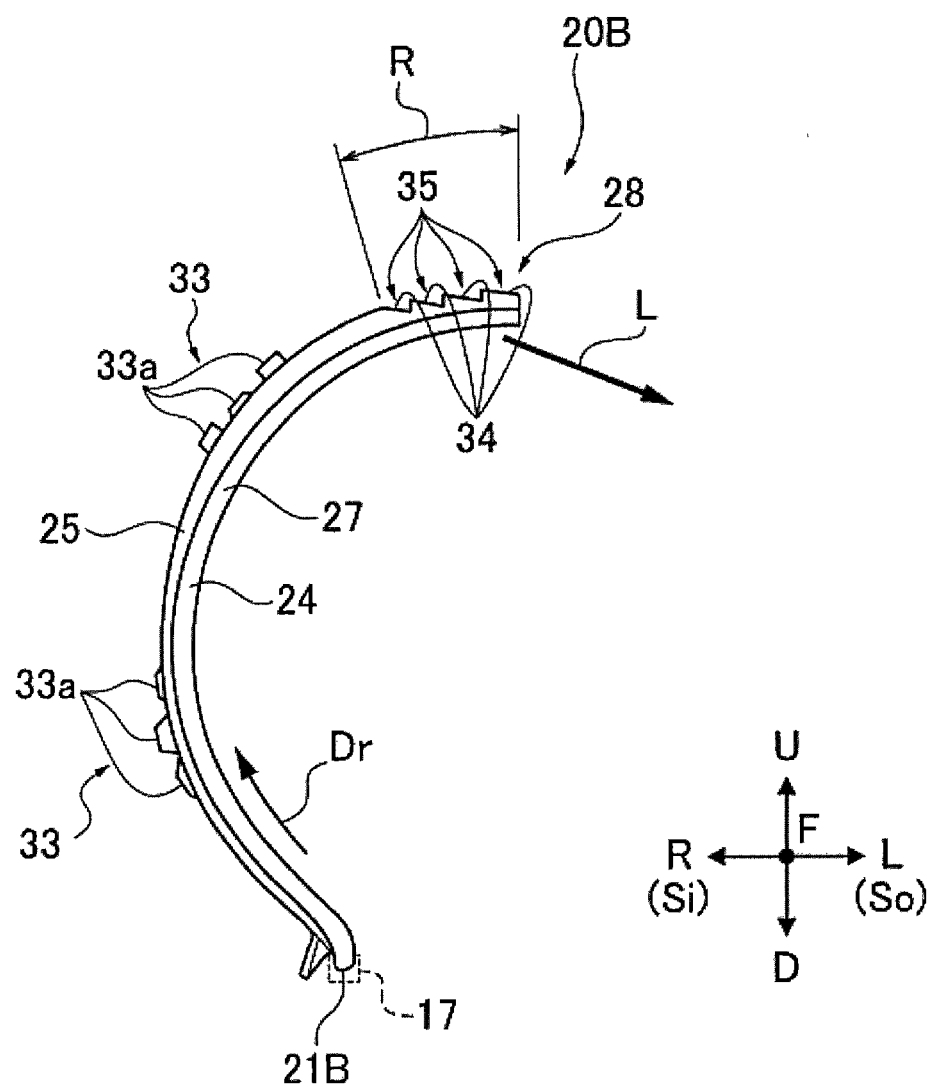

VEHICLE LAMP

TECHNICAL FIELD

The present invention relates to a vehicle lamp which employs an elongated light guide member.

BACKGROUND ART

In a vehicle lamp employed in a vehicle, for example, it is contemplated to provide and employ an elongated light guide member as a side marker lamp (for example, refer to Patent Literature 1). The light guide member is provided in a lamp chamber of the vehicle lamp so that a prism part is formed on a back face all over region in full length, and a surface thereof is oriented to a front side of the vehicle while one end thereof is opposed to a light source. In this light guide member, light emitted from the light source is appropriately reflected on the prism part while being guided in a longitudinal direction and the reflected light is thereby mainly emitted in a radiation direction which is oriented from the prism part (back face) to the surface. In this manner, in the vehicle lamp, the light guide member can be illuminated all over the region in full length to be thereby able to function as the side marker lamp.

CITATION LIST

Patent Literature

Patent Literature 1; Japanese Unexamined Patent Application Publication No. 2013-171658

SUMMARY OF THE INVENTION

Problems to be Solved by the Invention

Here, in the side marker lamp employed in the vehicle, it is required to emit light with a prescribed luminous intensity or the like, not only in a prescribed range of angles along a horizontal plane, but also towards a prescribed range of angles, when viewed in a vertical direction. However, in the vehicle lamp, the light guide member is basically intended to emit light in an irradiation direction; and therefore, it is easy to preferably illuminate a front side of the vehicle to which the irradiation direction is oriented, whereas it is not easy to preferably illuminate a lateral side of the vehicle. In particular, if the vehicle lamp is configured so that the light source is provided at a lower part and then the light guide member is disposed to guide light towards an upper side, it is difficult to emit the light not only to the lateral side of the vehicle, but also in a downward direction, when viewed in the vertical direction.

The present invention has been made in view of the circumstance described above, and it is an object of the present invention to provide a vehicle lamp which is capable of emitting light not only in a direction which forms an angle in the irradiation direction, but also in a downward direction, even in a case where a light guide member has been provided to upwardly guide the light from a light source that has been provided at a lower part.

Means for Solving the Problem

A vehicle lamp according to aspect of the present invention, comprising: an elongated light guide member which is provided in a lamp chamber while an incident end part is positioned at a lower side; and a light source which is provided in the lamp chamber so as to oppose to the incident end part, wherein the light guide member has: a light guide main part which has an elongated shape while one end is defined as the incident end part and in which a prism part has been provided along a longitudinal direction so as to emit, in an irradiation direction, a portion of light which has been made incident from the incident end part; and a flange part which projects from the light guide main part in a direction intersecting the irradiation direction, and wherein a reflecting surface which forms an angle of depression with respect to a projecting end face when viewed from the incident end part side is provided in the flange part, in a prescribed range when viewed in the longitudinal direction.

The vehicle lamp according to another aspect of the present invention, the reflecting surface is formed of a cutout part which partially cuts out a projecting end part of the flange part.

The vehicle lamp according to another aspect of the present invention, a plurality of the cutout parts are continuously provided in the flange part.

The vehicle lamp according to another aspect of the present invention, the respective cutout parts are formed to be equal to each other in dimensional shape.

The vehicle lamp according to another aspect of the present invention, the light guide member has an elongated shape which is erected while curving from the incident end part to an outside of a vehicle, and the prescribed range, in the flange part, is set to extend to the incident end part side from an upper end position which is positioned at an uppermost side in the light guide member.

The vehicle lamp according to another aspect of the present invention, the light guide member has an annular shape which is erected while curving from the incident end part and thereafter hangs while curving towards another end which is positioned outside of the vehicle more significantly than the incident end part.

The vehicle lamp according to another aspect of the present invention, the light guide member, in the lamp chamber that has been provided at a front part of the vehicle, is provided to position said another end at an outside in a leftward and rightward direction of the vehicle, while the irradiation direction is taken along an upward and backward direction of the vehicle.

The vehicle lamp according to another aspect of the present invention, the light guide member is provided in the lamp chamber while the light guide main part at the incident end part side is positioned at a front side with respect to the light guide main part at said another end side.

The vehicle lamp according to another aspect of the present invention, the light source is defined as a first light source, the incident end part is defined as a first incident end part, and said another end of the light guide member is defined as a second incident end part, and the vehicle lamp further comprises a second light source which is provided in the lamp chamber so as to oppose to the second incident end part.

Effect of the Invention

According to the vehicle lamp, it is possible to emit light in a direction which forms an angle in an irradiation direction, even in a case where a light guide member has been provided to upwardly guide the light from a light source which has been provided at a lower part.

When the reflecting surface is configured to be formed of a cutout part which partially cuts out a projecting end part of the flange part, it is possible to easily set the size and dimensions of the reflecting surface and an angle with respect to the projecting end face, and with a simple configuration, it is also possible to reliably emit the light not only in a direction which forms an angle in the irradiation direction, but also in a downward direction.

If the flange part is configured so that a plurality of the cutout parts are continuously provided, it is possible to increase an area of the reflecting surface without providing a large cutout part, and it is also possible to ensure the luminous quantity of the light to be emitted not only in a direction which forms an angle in the irradiation direction, but also in a downward direction, while restraining lowering of the strength of the flange part and, in turn, of the light guide member.

If the respective cutout parts are configured in such as manner as to be formed to be equal to each other in dimensional shape, it is possible to provide a plurality of reflecting surfaces, and it is also possible to increase the area of the reflecting surface while improving the appearance of the light guide member per se.

The light guide member has an elongated shape which is erected while curving from the incident end part to the outside of the vehicle, and if the prescribed range, in the flange part, is configured to be set so as to extend from an upper end part that is positioned to be the uppermost in the light guide member towards the incident end part side, even if there is a configuration in which light is guided by the light guide member towards an upper side from the light guide that has been provided at the lower part, it is possible to easily emit a portion of the light not only to the outside of the vehicle, but also in a downward direction.

When the light guide member is configured to have an annular shape which is erected while curving from the incident end part and thereafter hangs while curving to the other end that is positioned outside of the vehicle more significantly than the incident end part, the light that has been made incident from the incident end part and has travelled to the flange part can be easily emitted not only to the outside of the vehicle in the direction that forms an angle in the irradiation direction, but also in a downward direction.

If the light guide member is configured to be provided to position the other end outside of a leftward and rightward direction of the vehicle while the irradiation direction is taken along a upward and backward direction of the vehicle, in the lamp chamber that has been provided at a front part of the vehicle, the light that has travelled to the flange part, of the light that has been made incident from the incident end part, can be emitted not only to the outside when viewed in the leftward and rightward direction of the vehicle, but also in a downward direction.

When the light guide member is configured so that the light guide main part at the incident end part side is provided in the lamp chamber while being positioned at a front side with respect to the light guide main part, travelling of the light that is reflected on the reflecting surface to be thereby emitted not only in the direction that forms an angle in the irradiation direction, but also in a downward direction, can be restrained from being blocked by the light guide main part of the other end side.

If there is employed a configuration in which the light source is defined as a first light source, the incident end part is defined as a first incident end part, and the other end of the light guide member is defined as a second incident end part, and further, a second light source is provided in the lamp chamber so as to oppose to the second incident end part, with a simple configuration, it is possible to emit the light to the lower side outside of the leftward and rightward direction of the vehicle while illuminating the light guide main part more brightly and substantially uniformly.

BRIEF DESCRIPTION OF THE DRAWINGS

FIG. 1 is an explanatory view showing an appearance in a case where a vehicle lamp 10 of an embodiment according to the present invention has been mounted to a vehicle 50.

FIG. 2 is an explanatory view showing an appearance in a case where the vehicle lamp 10 is viewed from a front side.

FIG. 3 is an explanatory view showing an appearance in a case where a light guide member 20 provided in the vehicle lamp 10 is viewed from a front side.

FIG. 4 is an explanatory view showing an appearance in a case where the light guide member 20 is cut away at the cross section that has been obtained along the line I-I shown in FIG. 3.

FIG. 5 is an explanatory view showing an appearance in a case where the light guide member 20 is viewed in the direction indicated by the arrow A shown in FIG. 3, the explanatory view showing the periphery of a mounting part 33 of a flange part 25 thereof (a flange main part 32 thereof) in an enlarged manner.

FIG. 6 is an explanatory view showing an appearance in a case where the light guide member 20 in a state of having been provided in a lamp chamber 14 is viewed from a vehicle outside So in a leftward and rightward direction.

FIG. 7 is an explanatory view showing an appearance in a case where the light guide member 20 in the state of having been provided in the lamp chamber 14 is viewed from a lower side in a vertical direction.

FIG. 8 is an explanatory view for explaining a configuration of a cutout part 35 in the flange part 25 of the light guide member 20 (the flange main part 32).

FIG. 9 is an explanatory view for explaining functions of a reflecting surface 34 which has been formed of the cutout part 35.

FIG. 10 is an explanatory view showing a cross section which is similar to that of FIG. 4 in order to explain a configuration of a light guide member 20A of another example.

FIG. 11 is an explanatory view showing an appearance when viewed from a front side in order to explain a configuration of a light guide member 20B of another example.

MODE FOR CARRYING OUT THE INVENTION

Hereinafter, embodiments of a vehicle lamp according to the present invention will be described with reference to the drawings.

A vehicle lamp 10 of the embodiment as an example of a vehicle lamp according to the present invention will be described with reference to FIG. 1 to FIG. 9. The vehicle lamp 10, as shown in FIG. 1, is mounted to a vehicle 50 such as a motor vehicle in order to emit a front side. The vehicle lamp 10 forms a pair at a front end part of the vehicle 50; and the paired lamps are respectively provided at both of the left and right sides (104 10R), and are configured to be symmetrical in the leftward and rightward direction and substantially equal to each other in dimensions. Hereinafter, both of the left and right vehicle lamps 10 are configured to be symmetrical in the leftward and rightward direction and substantially equal to each other in dimensions; and therefore, a vehicle lamp 10 which has been provided at a left side will be described, whereas a description of a right side vehicle lamp 10R is omitted, and the configuration will be described by merely indicating the vehicle lamp 10. In the following description, the directions employed in the vehicle 50 that is destined to be mounted are: the upward and backward direction (refer to the arrow FB); the leftward and rightward (horizontal) direction (refer to the arrow RL); and the upward and downward (vertical) direction (refer to the arrow UD), when viewed from a driver. In addition, both of the vehicle lamps 10 are provided at both of the left and right sides of the front end part of the vehicle 50; and therefore, in the description associated with the leftward and rightward direction, with reference to the vehicle lamp 10 (the central position), the central position side of the vehicle 50 is defined as the vehicle inside Si when viewed in the leftward and rightward direction, and the outer side of the vehicle 50 is defined as the vehicle outside So when viewed in the leftward and rightward direction.

In the vehicle lamp 10, as shown in FIG. 2, a lamp chamber 14 is formed of: a lamp housing 11 of which front end has been opened; an inner panel 12 which has been provided inward thereof; and a lamp lens 13 which has been mounted to a front end of the lamp housing 11 (refer to FIG. 1). The lamp housing 11 constitutes a mounting part of a beam lamp 15 or a clearance lamp 16 which will be described later, and houses a lighting driving device for controlling lighting. The inner panel 12 is intended to enhance a design property of the vehicle lamp 10 while concealing substantial parts other than illumination parts in the beam lamp 15 and the clearance lamp 16 and the lighting driving device described above, and in the embodiment, silver-based vapor deposition is applied.

In the vehicle lamp 10, the beam lamp 15 and the clearance lamp (side marker lamp) 16 are provided in the lamp chamber 14. The beam lamp 15 is configured so that a light source is disposed in a reflector which has a rotational elliptical surface or a parabolic surface, for example, and on a front surface of the reflector, a lens 15a is mounted. In the beam lamp 15, when the light source is lit, the light therefrom travels to the lens 15a directly or via the reflector and then the light is emitted through the lens 15a to a front side in the upward and backward direction. In this manner, the beam lamp 15 can illuminate a front side of the vehicle 50.

The clearance lamp 16 is provided with: an elongated light guide member 20 which extends while surrounding the beam lamp 15; and light sources 17 which are provided at both end parts of the light guide member 20 (both of the incident end parts 21, 22 which will be described later). Both of the light sources 17 are intended to respectively form light sources in the clearance lamp 16, each of which is a self-irradiation, semiconductor-type light emitting part such as an LED or an organic EL (OLED). Both of the light sources 17, in the embodiment, are configured by employing LEDs. Both of the light sources 17, although they are not shown, are provided to be implemented on a light emitting board on which circuits for appropriate driving (turning the power ON and OFF) and connectors for supplying power have been provided. This light emitting board is provided to be fixed to a back face of the inner panel 12 or the like in a state in which the light sources 17 have been implemented, and the implemented light sources 17 are appropriately powered ON and OFF. In so far as both of the light sources 17 are concerned, as individually shown, what is provided at the vehicle inside is defined as a first light source 171, and what is provided at the vehicle outside So is defined as a second light source 172.

The light guide member 20 has a shape of an elongated rod, as a whole, and is formed in an annular shape (circular shape) which is erected while curving from a first incident end part 21 and thereafter hangs towards a second incident end part 22 so as to surround the beam lamp 15 substantially all over the region at the periphery when viewed from a front side in the upward and backward direction. The light guide member 20 is provided on the inner panel 12 while the first incident end part 21 is positioned at the vehicle inside Si and the second incident end part 22 is positioned at the vehicle outside So and further both of the incident end parts 21, 22 are positioned at a lower part. Hereinafter, the longitudinal direction of the light guide member 20 that extends while surrounding the beam lamp 15 is defined as the circumferential direction Dr, and the orientation from the first incident end part 21 towards the second incident end part 22 is defined as a front side in the circumferential direction Dr.

The light guide member 20 is formed of a glass material or a resin material. As the resin material, polycarbonate (PC), a methacryl resin (PMMA), a cyclic olefin copolymer (PCO) or the like can be employed, and in the embodiment, an acrylic resin is employed. In the light guide member 20, the first light source 171 is opposed to the first incident end part 21, and the second light source 172 is provided to be opposed to the second incident end part 22. In the light guide member 20, the light that has been emitted from the first light source 171 is incident from the first incident end part 21, and the light that has been emitted from the second light source 172 is incident from the second incident end part 22.

In the light guide member 20, in the embodiment, as shown in FIG. 3, the first incident end part 21 and the second incident end part 22 are connected to each other by way of a bridging piece part 23. The bridging piece part 23 is provided to bridge the first incident end part 21 and the second incident end part 22 without blocking the incidence to the first incident end part 21 from the first light source 171 and the incidence to the second incident end part 22 of the light from the second light source 172 (refer to FIG. 6 and FIG. 7). The bridging piece part 23 assists the activities of positioning and mounting to the inner panel 12 of the light guide member 20, and forms the light guide member 20 in a seamless, annular shape to thereby facilitate handing thereof.

The light guide member 20, as shown in FIG. 4, has a light guide main part 24 and a flange part 25 which have been formed to be integral with each other. The light guide main part 24 has an elongated columnar shape which extends along the circumferential direction Dr, as a whole; constitutes the first incident end part 21 at an end part of the vehicle inside Si; and constitutes the second incident end part 22 at an end part of the vehicle outside So (refer to FIG. 6 and FIG. 7). In the light guide main part 24, in the embodiment, the first incident end part 21 and the second incident end part 22 are curved to a rear side in the upward and backward direction (refer to FIG. 3, FIG. 6, and FIG. 7 or the like), and can be positioned at a back side of the inner panel 12 (refer to FIG. 2 or the like). In the light guide main part 24, by utilizing a full reflection, the light that has been made incident from each of the incident end parts 21, 22 is travelled in the circumferential direction Dr (the positive side and the negative side). Incidentally, although in the embodiment, the light guide main part 24 is formed in the columnar shape, the shape at the cross section may be an elliptical shape, a rectangular columnar shape, or any other shape, for example, as long as the entirety thereof is formed in an elongated shape which extends along the circumferential direction Dr, without being limitative to the configuration of the embodiment.

In the light guide main part 24, a prism part 26 is provided at a rear side in the upward and backward direction. The prism part 26, on the back face of the rear side in the upward and backward direction, is provided in a belt-shaped region over a substantially full length along the circumferential direction Dr (longitudinal direction) in prescribed widthwise dimensions. The prism part 26 forms a plurality of reflecting surfaces as a full reflection prism, or alternatively, forms a plurality of reflecting surfaces while aluminum or silver is provided on the back face (the exterior face of the light guide main part 24) by means of vapor deposition or coating or the like, and a wavy shape is formed when viewed at a cross section along the circumferential direction Dr. The prism part 26 reflects a portion of the light that travels inside of the light guide main part 24 towards a front side in the upward and backward direction, and a portion of the reflected light is formed at a small angle of incidence with respect to a surface at the front side in the upward and backward direction in the light guide main part 24 (light emission surface 27 which will be described later), and is then emitted from the surface towards the front side in the upward and backward direction.

Thus, in the light guide main part 24, the surface at the front side in the upward and backward direction functions as a light emission surface 27, and the front side in the upward and backward direction (the direction from the prism part 26 towards the light emission surface 27) is defined as an irradiation direction Di. In other words, in the light guide main part 24, all over the region in full length when viewed in the circumferential direction Dr, the position of the prism part 26 is set so that the light emission surface 27 is positioned at the front side in the upward and backward direction. In the prism part 26, in the embodiment, what is positioned at the first incident end part 21 side from an upper end position 28 in the light guide main part 24 (refer to FIG. 3 or the like) is associated with the travelling direction of the light that has been made incident from the first incident end part 21 (the positive side in the circumferential direction Dr), and what is positioned at the second incident end part 22 side from the upper end position 28 is associated with the travelling direction of the light that has been made incident from the second incident end part 22 (the negative side in the circumferential direction Rd). In the light guide main part 24, the light is emitted from the light emission surface 27 by the use of function of the prism part 26 while the light that has been made incident from each of the incident end parts 21, 22 is travelled in the circumferential direction Dr, and the light is thereby emitted at a substantially uniform luminous intensity all over the region in full length.

The flange part 25 is formed to project in the direction intersecting the irradiation direction Di from the light guide main part 24, and is provided over the region in a substantially full length of the light guide main part 24. The flange part 25, in the embodiment, has: a flange base part 31 which projects at a rear side in the upward and backward direction from the light guide main part 24; and a flange main part 32 which projects from a projecting end part thereof to the outside in a irradiation direction when viewed from a central position of the light guide main part 24 that is formed in the annular shape. In the embodiment, the flange main part 32 (flange part 25) thus projects in the irradiation direction that is substantially orthogonal to the irradiation direction Di (upward and backward direction). The flange par 25 is provided in order to mount the light guide main part 24 to the inner panel 12, and mounting parts 33 are provided at four parts so as to be spaced from each other when viewed in the circumferential direction Dr (longitudinal direction).

One of the respective mounting parts 33, which is indicated by the arrow A, is shown in FIG. 5. The mounting part 33, as shown in FIG. 5, has a plurality of (in this example, three) claw pieces 33a which project to a rear side in the upward and backward direction from the projecting end part 32a of the flange main part 32 of the flange part 25, and which are respectively formed in shapes corresponding to those of mounted parts (not shown) which have been provided on the inner panel 12. This is also true for other mounting parts 33. Thus, the light guide member 20 is positioned and mounted to the inner panel 12 by disposing the light guide main part 24, the flange part 25, and the bridging piece part 23 at prescribed positions of the inner panel 12 and then inserting each claw piece 33a of each mounting part 33 into the corresponding mounted part of the inner panel 12. In this manner, it is possible to position and mount the light guide member 20 to the inner panel 12, without degrading the functions of emitting the light in the irradiation direction Di, at the substantially uniform luminous intensity all over the region in full length in the light guide main part 24.

In the flange part 25, a plurality of cutout parts 35 are provided to form a reflecting surface 34 (refer to FIG. 3 or the like). Each of these cutout parts 35, as shown in FIG. 8, is formed to partially cut out the projecting end part 32a of the flange main part 32 of the flange part 25, and is formed to be equal in dimensional shape in the embodiment. Each reflecting surface 34 is formed on a surface outside of the irradiation direction that has been defined by the cutout part 35, and is provided to form an angle of depression angle with respect to a projecting end face 32b when viewed at the positive side in the circumferential direction Dr (from the first incident end part 21 side). On the other hands, each reflecting surface 34 is formed to be an inclined surface to more gradually reduce the projecting quantity of the flange main part 32 (height dimensions when viewed in the irradiation direction) as it advances to the deeper side (the negative side in the circumferential direction Dr) when viewed at the positive side in the circumferential direction Dr (from the first incident end part 21 side). Each of the reflecting surfaces 34, in the embodiment, is formed to be inclined at an angle of 7.5 degrees to a lower side with respect to a horizontal plane (orthogonal plane in the upward and downward direction). Each reflecting surface 34, in the embodiment, is provided in a prescribed range R which is oriented from a substantial upper end position 28 in the light guide member 20 towards the first incident end part 21 side, that is, from the substantial upper end position 28 towards the negative side in the circumferential direction Dr, when viewed in the circumferential direction Dr (longitudinal direction). The prescribed range R is set in order to adjust the luminous quantity of the light that is emitted not only to the lateral side of the vehicle 50, obtained by providing each reflecting surface 34, but also in a downward direction, when viewed in the upward and downward direction, as described later.

In the light guide member 20, as shown in FIG. 6 and FIG. 7, in the state of having been provided in the lamp chamber 14, when viewed in the upward and backward direction, the light guide main part 24 at the first incident end part 21 side is positioned at a front side with respect to the light guide main part 24 at the second incident end part 22 side. The light guide member 20, as a whole, is formed to be depressed so as to be more gradually positioned at a rear side in the upward and backward direction from the first incident end part 21 to the positive side in the circumferential direction Dr, that is, towards the second incident end part 22, since the light emission surface 27 of the light guide main part 24 is oriented to the front side in the upward and backward direction.

In the light guide member 20, when the first light source 171 and the second light source 172 are lit, the light therefrom is incident inward of the light guide main part 24 from each of the incident end parts 21, 22. At the light guide main part 24, the light from the first light source 171 then travels from the first incident end part 21 to the positive side in the circumferential direction Dr, and the light from the second light source 172 travels from the second incident end part 22 to the negative side in the circumferential direction Dr. At this time, in the light guide member 20, most of the incident light travels inside of the light guide main part 24 owing to a full reflection, and the remaining portion of the light travels inside of the flange part 25 that has been formed to be integral with the light guide main part 24, that is, inside of the flange base part 31 and the flange main part 32. The light that travels inside of the light guide main part 24, a portion of which is reflected on the prism part 26 as the light travels, is thereby emitted from the light emission surface 27 in the irradiation direction Di. Thus, in the light guide member 20, the light guide main part 24 can be illuminated at the substantially uniform luminous intensity all over the region in full length, mainly with the first light source 171 as to a region from the first incident end part 21 to the upper end position 28, and mainly with the second light source 172 as to a region from the second incident end part 22 to the upper end position 28. At this time, in the flange part 25, as described above, although the remaining light travels, the light of such kind is not basically intentionally emitted, and is thus hardly visually recognized. In other words, in the light guide member 20, the light that has travelled to the flange part 25 is not actively employed to illuminate the member per se. In this manner, in the vehicle lamp 10, the light guide 20 (the light guide main part 24) can be illuminated so as to surround the periphery of the beam lamp 15, and can function as the clearance lamp 16 as well.

Here, the clearance lamp 16 is required to be able to view all the positions (light beams in all the directions at the prescribed luminous intensity or more), between a plane at an angle of 15 degrees to an upper side and a plane at an angle of 15 degrees to a lower side with respect to a horizontal plane including a horizontal line which passes through a center and which is orthogonal to the travelling direction of the vehicle 50, and within a range which is surrounded by a plane at an angle of 45 degrees in an inward direction and a plane at an angle of 80 degrees in an outward direction more significantly than a vertical plane which is parallel to the travelling direction of the vehicle 50. In the clearance lamp 16, the front side in the upward and backward direction is basically provided as the irradiation direction Di, thus making it possible to ensure the prescribed luminous density when viewed from the front side in the upward and backward direction. In addition, in the light guide member 20, the front side in the upward and backward direction is defined as the irradiation direction Di; and however, a full reflection is utilized and the light guide main part 24 is formed in the columnar shape; and therefore, even in a case where the guide member is viewed in the direction of an angle of 45 degrees irrespective of whether the member may be inside or outside, it is possible to ensure the prescribed luminous density. Further, in the light guide member 20, the light that has been emitted from each of the light sources 17 that are positioned at the lower side is emitted from the light emission surface 27 while being guided to an upper side, and the front side in the upward and backward direction is defined as the irradiation direction Di; and therefore, even in a case where the guide member is viewed in the direction at an angle of 15 degrees to an upper side with respect to the horizontal plane, it is possible to ensure the prescribed luminous intensity. However, the light guide member 20 is configured to emit, in the irradiation direction Di, the light that has been emitted from each of the light sources 17 that are positioned at the lower side while being guided to an upper side; and therefore, it is difficult to ensure the prescribed luminous intensity in a case where the guide member is viewed in a direction which is close to an angle of 80 degrees in the outward direction and in a direction which is close to an angle of 15 degrees to a lower side with respect to the horizontal plane.

From the foregoing description, in the invention of the present application, in the flange part 25 of the light guide member 20, the reflecting surface 34 is provided in the prescribed range R from the substantial upper end position 28 towards the first incident end part 21 side (the negative side in the circumferential direction Dr). Thus, in the light guide member 20 (clearance lamp 16), it is possible to ensure the prescribed luminous intensity, even in a case where the light guide member is viewed in the direction of an angle of 80 degrees in the outward direction and in the direction of an angle of 15 degrees to a lower side with respect to the horizontal plane. With regard to this matter, hereinafter, a further description will be furnished.

In the light guide member 20, in the flange part 25, each reflecting surface 34 is formed of each cutout part 35 to partially cut out the projecting end part 32a of the flange main part 32. Each of the reflecting surfaces 34 forms an angle of depression with respect to the projecting end face 32b of the flange main part 32 when viewed at the positive side in the circumferential direction Dr (from the first incident end part 21 side); and therefore, a portion of the light that has been emitted from the first light source 171, that has been incident from the first incident end part 21, and that has travelled the flange main part 32 of the flange part 25 in the circumferential direction Dr, can be emitted from the light guide member 20 not only in the direction along the plane including the circumferential direction Dr, but also towards a lower direction. With respect to this matter, a further description will be furnished with reference to FIG. 9. In the FIG. 9, in order to ensure a clear understanding of functions exerted by the reflecting surface 34, the appearance in a case where the reflecting surface 34 has been provided while a single cutout part 35 has been formed in the flange main part 32 (light guide member 20) is shown in a state in which it is viewed at a cross section including the circumferential direction Dr. In addition, in FIG. 9, in the flange main part 32 (light guide member 20), the projecting end face 32b1 in a case where the cutout part 35 (reflecting surface 34) is not provided is indicated by the double-dotted chain line.

In the flange main part 32, of the light that has been emitted from the first light source 171 and incident from the first incident end part 21, the remaining light that does not travel to the light guide main part 24 travels to the positive side in the circumferential direction Dr. FIG. 9 shows an optical path Op through which the light passes as one example travelling the inside of the flange main part 32 to the positive side in the circumferential direction Dr. In the optical path Op, by utilizing a difference in refractive index between the flange main part 32 and the outside thereof, a full reflection arises on the projecting end face 32*b* (outer circumferential face) as an interface and on an inner circumferential face 32*c*, and the thus reflected light travels the inside of the flange main part 32 to the positive side in the circumferential direction Dr. In the flange main part 32, in a case where the cutout part 35 (reflecting surface 34) is not provided, a full reflection then arises on a projecting end face 32*b*1 as well, and the thus reflected light thereby travels the inside of the flange main part 32 to the positive side in the circumferential direction Dr, as in an optical path Op indicated by the dashed line. However, in the flange main part 32, the reflecting surface 34 to form an angle of depression with respect to the projection end face 32*b* when viewed from the first incident end part 21 side is provided, so that the angle of incidence with respect to the reflecting surface 34 of the optical path Op is reduced. In addition, in the flange main part 32, if the light travelling the optical path Op is reflected by the reflecting surface 34, the reflected light travels to the inner circumferential face 32*c* at a smaller angle of incidence than a critical angle, and is thereby emitted from the inner circumferential face 32*c* to the outside. Here, if a surface on which the light is to be reflected (fully reflected) varies due to an angle θ from the projecting end face 32*b*1 to the reflecting surface 34, and both of the incidence direction and the reflection direction vary according to such angle θ, so that an influence of two times (2θ) arises in the travelling direction of the light that has been thus reflected. Therefore, even if the angle of incidence to the reflecting surface 34 exceeds the critical angle, the angle of incidence to the inner circumferential face 32*c* of the light that has been thus reflected can be made smaller than the critical angle. In other words, the reflecting surface 34 can emit the reflected light from the inner circumferential face 32*c* even if the angle with respect to the projecting end face 32*b*1 is increased.

From the above description, in the flange main part 32, the reflecting surface 34 to form the angle of depression with respect to the projection end face 32*b* when viewed at the positive side in the circumferential direction Dr (from the first incident end part 21 side) is provided to be thereby able to reduce the angle of incidence to the inner circumferential face 32*c* when viewed at the cross section including the circumferential direction Dr. Here, in the flange main part 32 (light guide member 20), even the light that is parallel to the positive side in the circumferential direction Dr, as a whole, has a variety of angles with respect to the circumferential direction Dr. Thus, in the flange main part 32, the angle with respect to the circumferential direction Dr of the reflecting surface 34 is appropriately set in the light of the refractive index and the entire curvature in the light guide member 20 to be thereby able to adjust the quantity of light (luminous flux) of which angle of incidence to the inner circumferential face 32*c* is smaller than the refractive index. In addition, in the flange main part 32, the area of the reflecting surface 34 is increased to be thereby able to adjust the quantity of the light of which angle of incidence to the inner circumferential face 32*c* is smaller than the critical angle. The area of the reflecting surface 34 can be adjusted by changing the number of cutout parts 35 or changing the size of the cutout part 35, and can also be adjusted by changing the prescribed range R in which the reflecting surface 34 is substantially provided. Of the light in the travelling direction that is reflected by the reflecting surface 34, and that is smaller than the critical angle, a portion is emitted from an inner end face of the flange main part 32 of the flange part 25 (a part which is equivalent to the inner circumferential face 32*c*); another portion is emitted from the inner circumferential face 31*a* of the flange base part 31 of the flange part 25 (refer to FIG. 4); and the remaining portion is emitted from the inner circumferential face 24*a* of the light guide main part 24 (refer to FIG. 4). This is because an angle of incidence to the inner circumferential face 32*c* is at an angle when viewed at the cross section including the circumferential direction Dr; and hence, there may be a case in which the angle of incidence to the inner circumferential face 32*c* exceeds the critical angle when viewed at another cross section.

In this manner, in the flange main part 32 (light guide member 20), a portion of the light that travels from the first incident end part 21 side can be emitted from the inner circumferential face 32*c* that is positioned to oppose to each reflecting surface 34, or alternatively, to the inner circumferential face 21*a* or the inner circumferential face 24*a* in the vicinity thereof. The light is emitted from the flange main part 32 (light guide member 20) by the light travelling in the flange main part 32 being reflected by the reflecting surface 34 that forms an angle of depression with respect to the projecting end face 32*b*, and the thus emitted light approximately travels in the direction along a plane that includes the projecting direction of the flange main part 32. In addition, the light is reflected by each reflecting surface 34, and the angle of incidence with respect to the inner circumferential face 32*c*, the inner circumferential face 31*a*, or the inner circumferential face 24*a* becomes smaller than the critical angle, and the light thus travels to the inside in the irradiation direction more significantly than the circumferential direction Dr at the emission position thereof (refer to FIG. 9 or the like).

Here, the light guide member 20 is provided in an annular shape which surrounds the beam lamp 15 that illuminates the front side of the vehicle 50 (front side in the upward and backward direction) substantially all over the region in full circumference, and the direction along the projecting direction of the flange main part 32 thus becomes the lateral side of the vehicle 50. In addition, in the flange main part 32 (light guide member 20), each reflecting surface 34 is provided in the prescribed range R from the substantial upper end position 28 towards the first incident end part 21 side (the negative side in the circumferential direction Dr); and therefore, from the vicinity of the substantial upper end position 28 at which each reflecting surface 34 is positioned, it is possible to emit light L (refer to FIG. 3, FIG. 6, and FIG. 7) in a downward direction at which the second incident end part 22 has been provided. In addition, the light guide member 20 is provided while the second incident end part 22 is positioned at the vehicle outside So. In this manner, the light guide member 20 can emit light (light L) not only to the vehicle outside So when viewed in the leftward and rightward direction, but also in a downward direction in the upward and downward direction, and it is possible to ensure the prescribed luminous intensity, even in a case where the light guide member is viewed in the direction at an angle of 80 degrees in the outward direction and in the direction at an angle of 15 degrees to a lower side with respect to the horizontal plane.

In this manner, in the vehicle lamp 10 of one embodiment of the vehicle lamp according to the present invention, in the light guide member 20 as the clearance lamp 16, the reflecting surface 34 that forms an angle of depression with respect to the projecting end face 32*b* when viewed at the positive side in the circumferential direction Dr (from the first incident end part 21 side) is provided in the flange part 25 that projects from the light guide main part 24 in the direction intersecting the irradiation direction Di (in the flange main body pat 32 in the embodiment). In the vehicle lamp 10, it is possible to emit the light from the flange part 25 side towards the light guide main body 24 side along the plane including the projecting direction (the direction that forms an angle in the irradiation direction Di) of the flange part 25 (flange main part 32); and therefore, even in a case where the light guide member 20 has been provided to upwardly guide the light from the light source 17 that has been provided at the lower part, it is possible to emit the light not only in the direction that forms an angle in the irradiation direction Di, but also in a downward direction.

In addition, in the vehicle lamp 10, the reflecting surface 34 is provided in the flange part 25 (flange main part 32), and the light is thereby emitted not only in the direction that forms an angle in the irradiation direction Di, but also in a downward direction, by utilizing the light that travels to the flange part 25. Here, in the light guide member 20, basically from the light guide main part 24 all over the region in full length, the light is emitted in the irradiation direction Di at a substantially uniform luminous intensity and the emitted light is visually recognized as the clearance lamp 16. Thus, in the vehicle lamp 10, it is possible to utilize the remaining portion of the light that is emitted in the irradiation direction Di in the light guide member 20; and therefore, it is also possible to emit the light not only in the direction that forms an angle in the irradiation direction Di, but also in a downward direction, without lowering of the luminous intensity in the irradiation direction Di or blocking the illumination all over the region in full length.

Further, in the vehicle lamp 10, the reflecting surface 34 is provided in the flange part 25 (flange main part 32) that has been provided to be integral with the light guide main part 24 in the light guide member 20. The flange part 25 is intended to position and mount the light guide main part 24 (light guide member 20) to the inner panel 12 without degrading the function of emitting the light in the irradiation direction Di at a substantially uniform luminous intensity all over the region in full length in the light guide main part 24. Thus, in the vehicle lamp 10, it is possible to emit the light not only in the direction that forms an angle in the irradiation direction Di, but also in a downward direction, without blocking appropriate mounting to the inner panel 12 in the light guide member 20 and lowering of the luminous intensity in the irradiation direction Di or a substantially uniform illumination all over the region in full length.

In the vehicle lamp 10, the projecting direction from the light guide main part 24 of the flange part 25 (flange main part 32) is defined as the outside of the irradiation direction when viewed from the central position of the light guide main part 24; and therefore, the plane including the projecting direction that is the irradiation direction of the light by the reflecting surface 34 can be defined as a surface on which the annular (circular) light guide main part 24 (light guide member 20) is positioned, that is, the plane including the circumferential direction Dr (longitudinal direction). Hence, in the vehicle lamp 10, the light guide member 20 (light guide main part 24) is provided along the circumferential direction Dr (longitudinal direction) in the leftward and rightward direction of the vehicle 50, thereby making it possible to emit the light not only to the outside of the leftward and rightward direction of the vehicle 50 (vehicle widthwise direction), but also in a downward direction.

In the vehicle lamp 10, the reflecting surface 34 is formed of the cutout part 35 that partially cuts out the projecting end part 32a of the flange part 25 (flange main part 32) of the light guide member 20. Thus, in the vehicle lamp 10, it is possible to easily form the reflecting surface 34, and it is also possible to easily set the size and dimensions of the reflecting surface 34 and an angle with respect to the projecting end face 32b (the circumferential direction Dr). In this manner, in the vehicle lamp 10, with a simple configuration, it is possible to more reliably emit the light not only in the direction that forms an angle in the irradiation direction Di, but also in a downward direction.

In the vehicle lamp 10, a plurality of cutout parts 35 are continuously provided in the flange part 25 of the light guide member 20. In the vehicle lamp 10, the area of the reflecting surface 34 can be thus increased without providing a large cutout part 35. In this manner, in the vehicle lamp 10, it is possible to ensure the luminous quantity of the light that is emitted not only in the direction that forms an angle in the irradiation direction Di, but also in a downward direction, while restraining lowering of the strength of the flange part 25 and in turn, of the light guide member 20. This is particularly effective, since it is easy to mold each cutout part 35 and its periphery in a case where the light guide member 20 is formed by die molding.

In the vehicle lamp 10, the respective cutout parts 35 are formed to be equal to each other in dimensional shape; and therefore, it is possible to provide the plurality of reflecting surfaces 34 while improving the appearance of the light guide member 20 per se, and it is also possible to increase the area of the reflecting surface 34 as a whole.

In the vehicle lamp 10, the light guide member 20 is adapted to have the elongated shape that is erected curving from the first incident end part 21 to the outside of the vehicle 50, and the prescribed range R when viewed in the circumferential direction Dr (longitudinal direction) in which the reflecting surface 34 is to be provided is set so as to extend from the upper end position 28 to the first incident end part 21 side (the negative side in the circumferential direction Dr). In the vehicle lamp 10, the reflecting surface 34 is thus provided at the upper end position 28; and therefore, even in a configuration in which the light is guided by the light guide member 20 to an upper side from the light source 17 that has been provided at the lower part, it is possible to easily emit a portion of the light to the lower side. In addition, in the vehicle lamp 10, the light guide member 20 guides the light from the first incident end part 21 to an upper side outside of the vehicle 50; and therefore, by utilizing the guided light, it is possible to achieve easy emission to the outside of the vehicle 50.

In the vehicle lamp 10, the light guide member 20 has the annular shape that is erected to the outside while expanding from the first incident end part 21 to the inside of the vehicle 50 and thereafter hangs while curving towards the second incident end part 22 that is the other end positioned at the outside, and the reflecting surface 34 is provided in the prescribed range R that extends from the upper end position 28 to the first incident end part 21 side (the negative side in the circumferential direction Dr). Thus, in the vehicle lamp 10, the light that has been made incident from the first incident end part 21 and has travelled to the flange part 25 can be emitted not only to the vehicle outside So (outside of the leftward and rightward direction of the vehicle 50), but also in a downward direction.

In the vehicle lamp 10, in the lamp chamber 14 that has been provided at the front part of the vehicle 50, the light guide member 20 is provided to position the second incident end part 22 that is the other end outside of the leftward and rightward direction (vehicle widthwise direction) of the vehicle 50 while the irradiation direction Di is taken along the upward and backward direction of the vehicle 50. Thus, in the vehicle lamp 10, in the light guide member 20 as the clearance lamp 16, the light having travelled to the flange part 25, of the light having made incident from the first incident end part 21, can be emitted not only to the vehicle outside So (outside of the leftward and rightward direction of the vehicle 50), but also in a downward direction.

In the vehicle lamp 10, in the light guide member 20, the light guide main part 24 at the first incident end part 21 side is provided in the lamp chamber 14 while being positioned at the front side with respect to the light guide main part 24 at the second incident end part 22 (the other end) side.

Thus, in the vehicle lamp 10, the upper end position 28 at which the reflecting surface 34 has been provided in the flange part 25 (flange main part 32) that projects from the light guide main part 24 can be positioned at the front side in the upward and backward direction more significantly than the light guide main part 24 at the second incident end part 22 side. In this manner, in the vehicle lamp 10, travelling of the light that is reflected by the reflecting surface 34 to be thereby emitted not only in the direction that forms an angle in the irradiation direction Di, but also in a downward direction, can be restrained from being blocked by the light guide main part 24 (flange part 25) at the second incident end part 22 side (refer to light L of FIG. 6 and FIG. 7). Thus, in the vehicle lamp 10, it is possible to more reliably emit the light not only in the direction that forms an angle in the irradiation direction Di, but also in a downward direction.

In the vehicle lamp 10, the second light source 172 is provided to oppose to the second incident end part 22; and therefore, in the light guide main part 24, a region from the upper end position 28 leading up to the first incident end part 21 can be illuminated with the light from the first light source 171, and a region from the upper end part 28 leading up to the second incident end part 22 can be illuminated with the light from the second light source 172. Thus, in the vehicle lamp 10, it is possible to more reliably illuminate the entirety of the light guide main part 24 more brightly and substantially uniformly. In addition, in the vehicle lamp 10, the reflecting surface 34 is provided in the prescribed range R that extends from the upper end position 28 to the second incident end part 21 side (the negative side in the circumferential direction Dr); and therefore, the light from the first light source 171 that is incident from the first incident end part 21 can be reflected by the reflecting surface 34, and the travelling direction can be thereby varied. In the prescribed range R, the positive side in the circumferential direction Dr inside of the flange part 25 (light guide member 20) is substantially coincident with the vehicle outside So (outside of the leftward and rightward direction of the vehicle 50); and therefore, owing to the action on the reflecting surface 34, the light is emitted from the inner circumferential face 32c, the inner circumferential face 31a, or the inner circumferential face 24a that opposes to the reflecting surface 34, and the light can be easily emitted to the lower side outside of the leftward and rightward direction of the vehicle 50 (vehicle widthwise direction). Accordingly, in the vehicle lamp 10, with a simple configuration, it is possible to emit the light to the lower side outside of the leftward and rightward direction of the vehicle 50 while illuminating the light guide main part 24 more brightly and substantially uniformly.

Hence, in the vehicle lamp 10 of the embodiment according to the present invention, even in a case where the light guide member 20 has been provided to upwardly guide the light from the light source 17 that has been provided at the lower part, it is possible to emit the light not only in the direction that forms an angle in the irradiation direction Di, but also in a downward direction.

Incidentally, although the foregoing embodiment was described as to the vehicle lamp 10 as one example of the vehicle lamp according to the present invention, it is sufficient if there is a vehicle lamp comprising: an elongated light guide member which is provided in a lamp chamber while an incident end part is positioned at a lower side; and a light source which is provided in the lamp chamber so as to oppose to the incident end part, wherein the light guide member has: a light guide main part which has an elongated shape while one end is defined as the incident end part and in which a prism part has been provided along an longitudinal direction so as to emit a portion of the light that has been made incident from the incident end part in an irradiation direction; and a flange part which projects from the light guide main part in a direction intersecting the irradiation direction, and in the flange part, a reflecting surface which forms an angle of depression with respect to a projecting end face when viewed from the incident end part side is provided in a prescribed range when viewed in the longitudinal direction, without being limitative to the configuration of the foregoing embodiment.

In addition, in the foregoing embodiment, the flange part 25 of the light guide member 20 has the flange base part 31 and the flange main part 32, and in the flange main part 32, the reflecting surface 34 is provided. However, it is sufficient if there is the light guide member 20 in which the flange part 25 projecting from the light guide main part 24 has been provided in the direction intersecting the irradiation direction Di, without being limitative to the configuration of the foregoing embodiment. A light guide member 20A as another example is shown in FIG. 10. In the light guide member 20A, a flange part 25A is provided to project from a light guide main part 24 to the outside of the irradiation direction when viewed from a central position of the light guide main part 24. In the case of the light guide member 20A, a projecting end part 25a of the flange part 25A is partially cut out to thereby provide a cutout part as in FIG. 9 or the like, and a reflecting surface can be provided as in FIG. 9 or the like. In other words, the invention of the present application can be applied to the light guide member 20, as long as the flange part 25 projects from the light guide main part 24 in a direction which is not parallel to the irradiation direction Di.

Further, in the foregoing embodiment, the light guide member 20 is adapted to have the annular shape that is erected while curving from the first incident end part 21 to the outside of the vehicle 50 and thereafter hangs while curving towards the second incident end part 22. However, it is sufficient if there is the light guide member 20 that has an elongated shape erected while curving the incident end part to the outside of the vehicle 50, without being limitative to the configuration of the foregoing embodiment. A light guide member 20B as another example is shown in FIG. 11. The light guide member 20B has an elongated shape which is erected while curving from an incident end part 21B and a light source 17 is provided to oppose to the incident end part 21B. In this case as well, a reflecting surface 34 (cutout part 35) is provided in a prescribed range R which has been set while extending to the incident end part 21B side (the negative side in the circumferential direction Dr) from the upper end position 28 that is positioned at the uppermost side in the light guide member 20 in the flange part 25, thereby making it possible to emit the light not only in the direction that forms an angle in the irradiation direction Di, but also in a downward direction. Similarly, the light guide member may extend straightway or may be any other constituent element, without being limitative to the configuration of the foregoing embodiment, as long as it has an elongated shape which extends from an incident end part opposing to a light source.

In the foregoing embodiment, the first light source 171 is provided to oppose to the first incident end part 21, and the second light source 172 is provided to oppose to the second incident end part 22. However, there may be a configuration in which only the first light source 171 is provided to oppose to the first incident end part 21, without being limitative to the configuration of the foregoing embodiment.

The foregoing embodiment presents the vehicle lamp 10 that is employed as a front lamp (headlamp) of a vehicle (vehicle 50). However, the vehicle lamp according to the present invention may be any other lamp which is employed in a vehicle, without being limitative to the configuration of the foregoing embodiment, as long as there is employed a light guide member which is required to preferably illuminate not only a lateral side of a vehicle, but also a lower side thereof, while emitting, in a irradiation direction, the light from a light source that has been provided at a lower part.

Although in the foregoing embodiment, the light guide member 20 was intended to constitute the clearance lamp 16 in the vehicle lamp 10, any other lamp employed in a vehicle may be configured without being limitative to the configuration of the foregoing embodiment, as long as it is required to preferably illuminate a lateral side of a vehicle and a lower side while emitting in an irradiation direction the light from a light source that has been provided at a lower part.

In the foregoing embodiment, the light guide member 20 (light guide main part 24) is mounted to the inner panel 12 by the mounting part 33 that has been provided in the flange part 25 (flange main part 32 in the foregoing embodiment). However, the flange part 25 (flange main part 32) may be mounted to the beam lamp 15 or the lamp housing 11 for example, without being limitative to the configuration of the foregoing embodiment, as long as it is possible to mount the light guide member 20 (light guide main part 24) into the lamp chamber 14 or may be mounted to any other part.

Hereinabove, although the vehicle lamp of the present invention has been described so far, based on the embodiment, a specific configuration is not limitative to the embodiment, and a design change or an addition or the like is permissible without departing from the spirit of the present invention.

DESCRIPTION OF REFERENCE NUMERALS 10 (10R, 10L) Vehicle lamps
14 Lamp chamber
17 Light source
171 First light source
172 Second light source
20, 20A, 20B Light guide members
21 First incident end part (as one example of incident end part)
21B Incident end part
22 Second incident end part (as one example of the other end)
24 Light guide main part
25, 25A Flange parts
25a Projecting end part
26 Prism part
28 Upper end position
32a Projecting end part
32b Projecting end face
34 Reflecting surface
35 Cutout part
50 Vehicle
Di Irradiation direction
Dr Circumferential direction (as one example of longitudinal direction)
R Prescribed range

The invention claimed is:

1. A vehicle lamp comprising: an elongated light guide member which is provided in a lamp chamber, an incident end part of the light guide member is positioned at a lower side of the lamp chamber; and a light source provided in the lamp chamber so as to oppose the incident end part, wherein the light guide member comprises: a light guide main part which has an elongated shape having one end defined as the incident end part and in which a prism part has been provided along a longitudinal direction so as to emit, in an irradiation direction, a portion of light which has been made incident from the incident end part; and a flange part which projects from the light guide main part in a direction intersecting the irradiation direction, and wherein a reflecting surface which forms an angle of depression with respect to a projecting end face of the flange part when viewed from the incident end part side is provided in the flange part, in a prescribed range when viewed in the longitudinal direction.

2. The vehicle lamp according to claim 1, wherein the reflecting surface is formed of a cutout part which partially cuts out a projecting end part of the flange part.

3. The vehicle lamp according to claim 2, wherein a plurality of the cutout parts are continuously provided in the flange part.

4. The vehicle lamp according to claim 3, wherein the respective cutout parts are formed to be equal to each other in dimensional shape.

5. The vehicle lamp according to claim 1, wherein the light guide member has an elongated shape which is erected while curving from the incident end part to an outside of a vehicle, and
the prescribed range, in the flange part, is set to extend to the incident end part side from an upper end position which is positioned at an uppermost side in the light guide member.

6. The vehicle lamp according to claim 5, wherein the light guide member has an annular shape which is erected while curving from the incident end part and thereafter hangs while curving towards another end which is positioned outside of the vehicle more significantly than the incident end part.

7. The vehicle lamp according to claim 6, wherein the light guide member, in the lamp chamber that has been provided at a front part of the vehicle, is provided to position said another end at an outside in a leftward and rightward direction of the vehicle, while the irradiation direction is taken along an upward and backward direction of the vehicle.

8. The vehicle lamp according to claim 7, wherein the light guide member is provided in the lamp chamber while the light guide main part at the incident end part side is positioned at a front side with respect to the light guide main part at said another end side.

9. The vehicle lamp according to claim 6, wherein the light source is defined as a first light source, the incident end part is defined as a first incident end part, and said another end of the light guide member is defined as a second incident end part, and the vehicle lamp further comprises a second light source which is provided in the lamp chamber so as to oppose to the second incident end part.

* * * * *